US012648671B2

(12) United States Patent
Zhan

(10) Patent No.: US 12,648,671 B2
(45) Date of Patent: Jun. 9, 2026

(54) COOKING MACHINE

(71) Applicant: Tsann Kuen (Zhangzhou) Enterprise Co., Ltd., Zhangzhou (CN)

(72) Inventor: Yixin Zhan, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 778 days.

(21) Appl. No.: 18/087,978

(22) Filed: Dec. 23, 2022

(65) Prior Publication Data

US 2023/0240472 A1 Aug. 3, 2023

(30) Foreign Application Priority Data

Jan. 29, 2022 (CN) .......................... 202210110927.5

(51) Int. Cl.
*A47J 37/06* (2006.01)

(52) U.S. Cl.
CPC ................................ *A47J 37/0641* (2013.01)

(58) Field of Classification Search
USPC ......................................................... 137/455
See application file for complete search history.

(56) References Cited

U.S. PATENT DOCUMENTS

| | | | | |
|---|---|---|---|---|
| 4,418,615 A | * | 12/1983 | Higgins | .................... F24C 1/04 99/446 |
| 2014/0366746 A1 | * | 12/2014 | Tsai | .................... A47J 37/0641 99/403 |
| 2022/0175186 A1 | * | 6/2022 | Davis | ...................... F24C 7/087 |
| 2022/0175786 A1 | * | 6/2022 | Bausch | ................ A61K 31/519 |
| 2022/0395137 A1 | * | 12/2022 | Wang | .................. A47J 37/0641 |

* cited by examiner

*Primary Examiner* — Edward F Landrum
*Assistant Examiner* — Drew Joseph Mitchum
(74) *Attorney, Agent, or Firm* — Burris Law, PLLC

(57) ABSTRACT

A cooking machine includes a housing unit, a cooker unit, and a heating unit that is disposed in the housing unit. The housing unit includes a casing body, and a container that removably engages the casing body. The cooker unit is located below the heating unit, removably engages the casing body, and defines an accommodating space and an outlet. The accommodating space is located above the container. The accommodating space communicates with the container through the outlet. The heating unit is capable of providing hot air flow to heat the cooker unit.

7 Claims, 6 Drawing Sheets

COOKING MACHINE

CROSS-REFERENCE TO RELATED APPLICATION

This application claims priority to Chinese Invention Patent Application No. 202210110927.5, filed on Jan. 29, 2022.

FIELD

The disclosure relates to a home appliance for cooking foods, and more particularly to a cooking machine capable of frying ingredients therein via hot air flow.

BACKGROUND

Currently, a conventional air fryer generally includes a housing unit, a cooker body unit that removably engages the housing unit, and a heating unit that is mounted in the housing unit and that is located above the cooker body unit.

The cooker body unit may be pulled out of the housing unit so that ingredients may be put in, then when the cooker body unit containing the ingredients engages the housing unit, the ingredients may be cooked via hot air flow provided by the heating unit.

When the ingredients are cooked in the conventional air fryer, oil and water contained in the ingredients may flow out of the ingredients and accumulate at the bottom portion of the cooker body unit. The excess oil and water (i.e. the oil and water that accumulate) may affect the taste of the food. In addition, the oil accumulated in the cooker body unit may again be heated during the cooking process, which may generate excess grease and fill the air with smoke.

Currently, one of the solutions to the abovementioned problem is to provide an outlet at the bottom portion of the cooker body unit for discharging the water and the oil that accumulate in the cooker body unit, and is to equip the housing unit with a container that stores the discharged water and oil. Though the problem of the accumulated water and oil may be solved by this method, it is difficult to detach the container from the housing unit for cleaning. Thus, the conventional air fryer is not user-friendly and needs to be further improved.

SUMMARY

Therefore, an object of the disclosure is to provide a cooking machine that can alleviate at least one of the drawbacks of the prior art.

According to the disclosure, the cooking machine includes a housing unit, a heating unit, and a cooker unit. The heating unit is disposed in the housing unit. The cooker unit is located below the heating unit. The housing unit includes a casing body, and a container that removably engages the casing body. The cooker unit removably engages the casing body, and defines an accommodating space that is located above the container, and an outlet through which the accommodating space communicates with the container. The heating unit is capable of providing hot air flow to heat the cooker unit.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
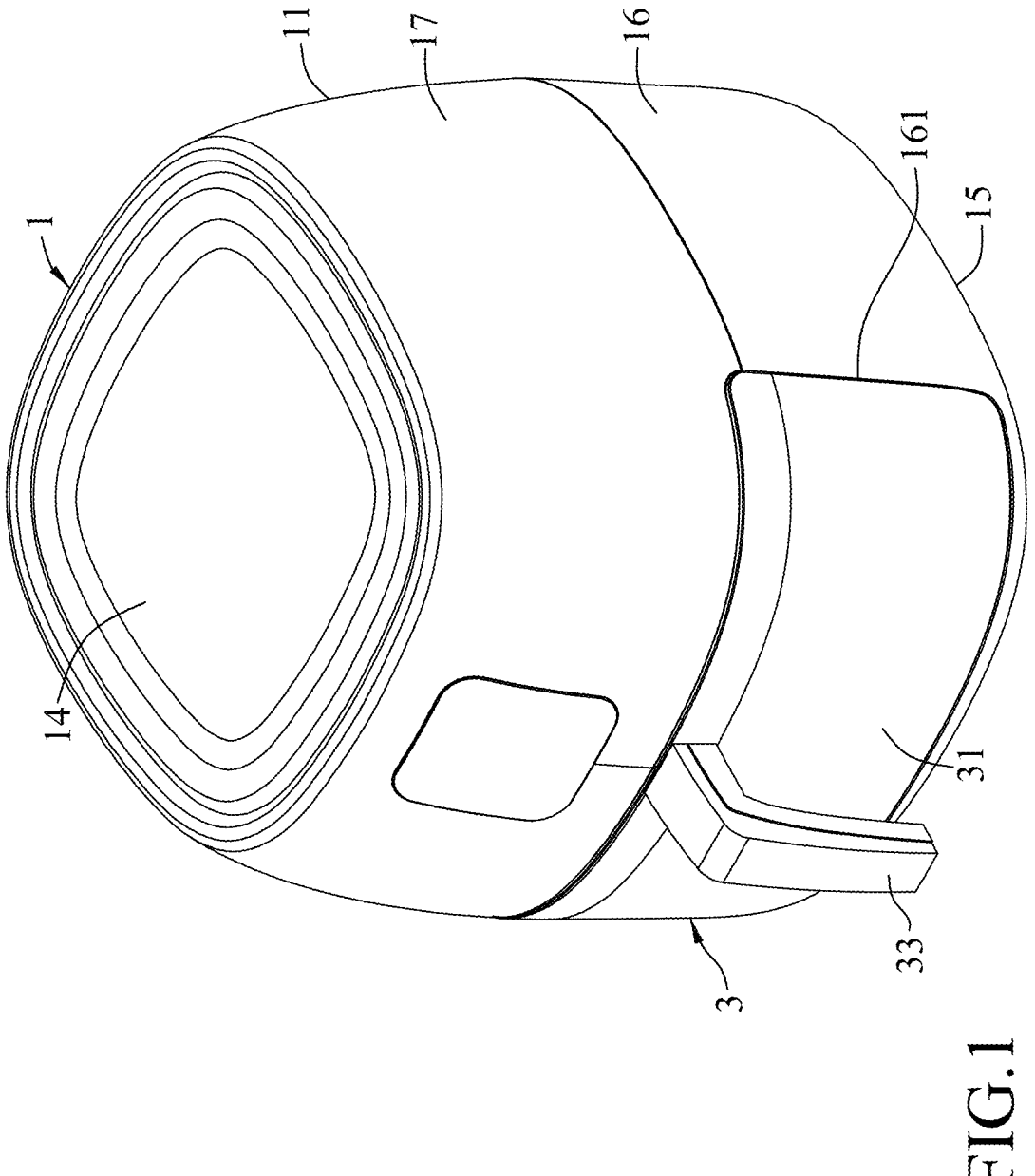
FIG. 1 is a perspective view of an embodiment of a cooking machine according to the disclosure, illustrating a cooker body unit of the embodiment in an engaging state.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
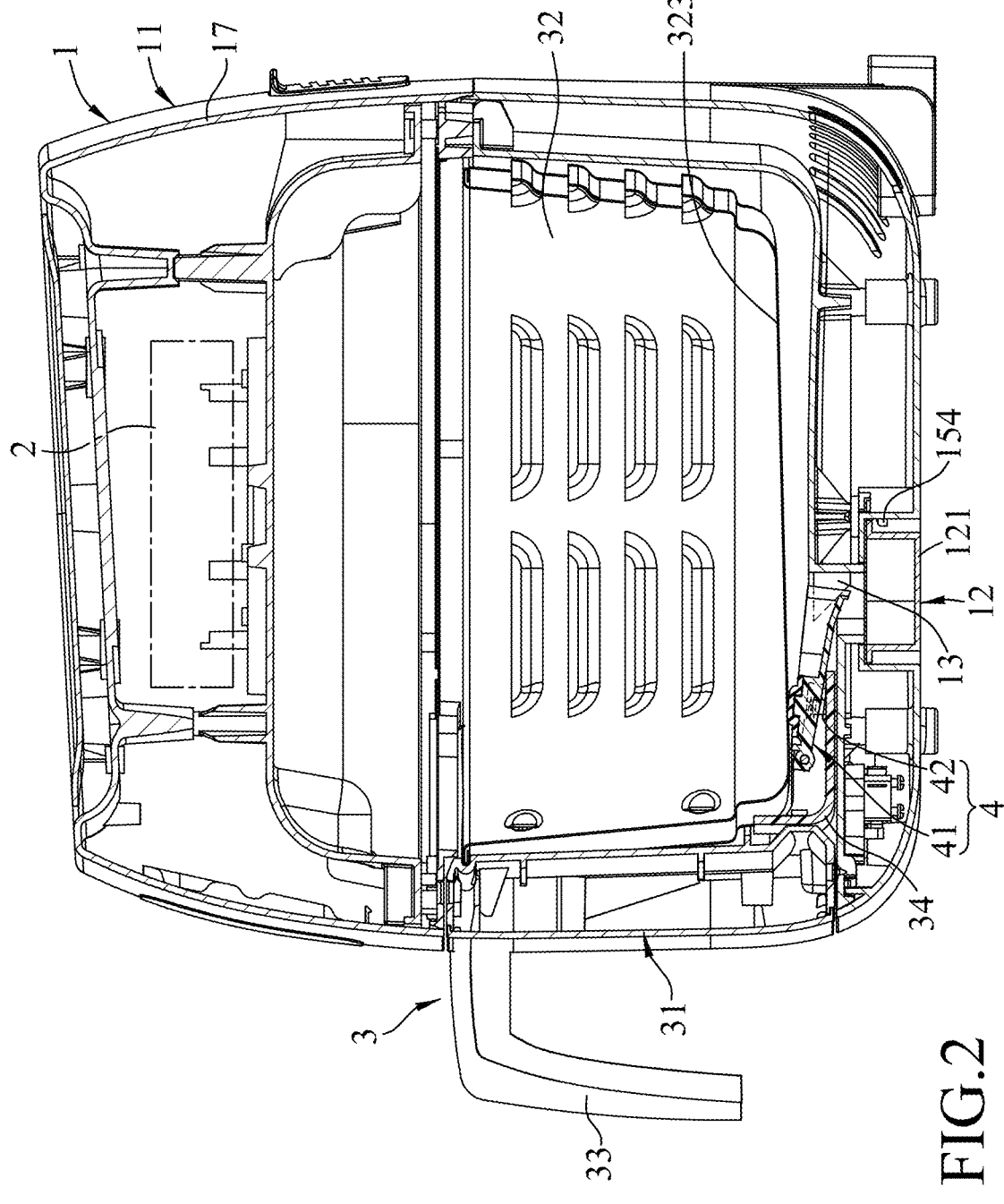
FIG. 2 is a sectional view of the embodiment.
Figure 3:
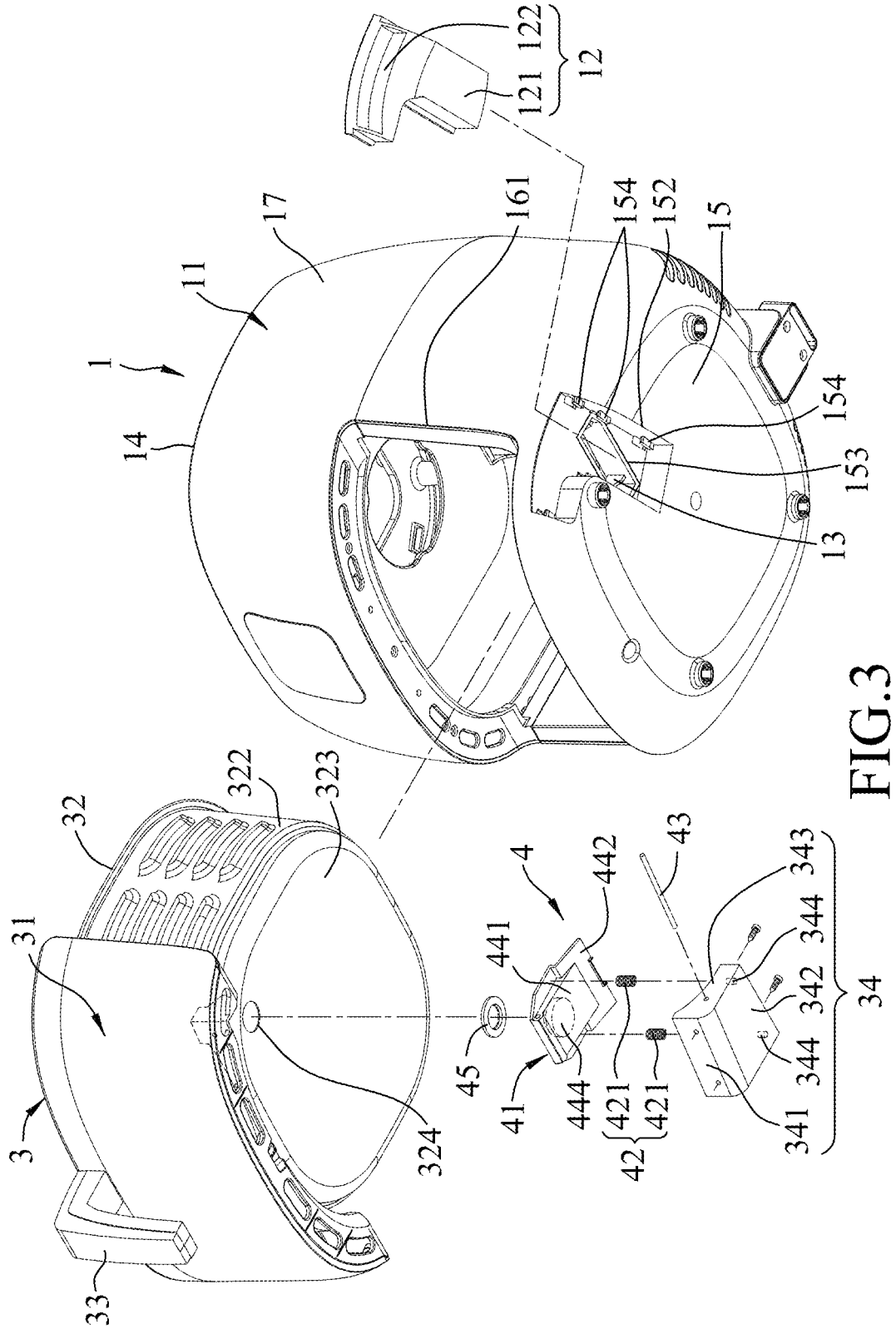
FIG. 3 is an exploded perspective view of the embodiment.

Referring to FIGS. 1 to 3, an embodiment of a cooking machine according to the disclosure is configured to be an air fryer, and includes a housing unit 1, a heating unit 2 (see FIG. 2) that is disposed in the housing unit 1, a cooker unit 3 that removably engages the housing unit 1 and that is located below the heating unit 2, and a valve unit 4 that is disposed at a bottom portion of the cooker unit 3. The valve unit 4 includes a valve body assembly 41 and a resilient assembly 42.

In the following description, a moving direction of the cooker unit 3 in which the cooker unit 3 is pulled out of the housing unit 1 so as to be separated from the housing unit 1 is defined as a front direction, and another moving direction of the cooker unit 3 in which the cooker unit 3 is pushed toward the housing unit 1 so as to engage the housing unit 1 is defined as a rear direction.

Figure 4:
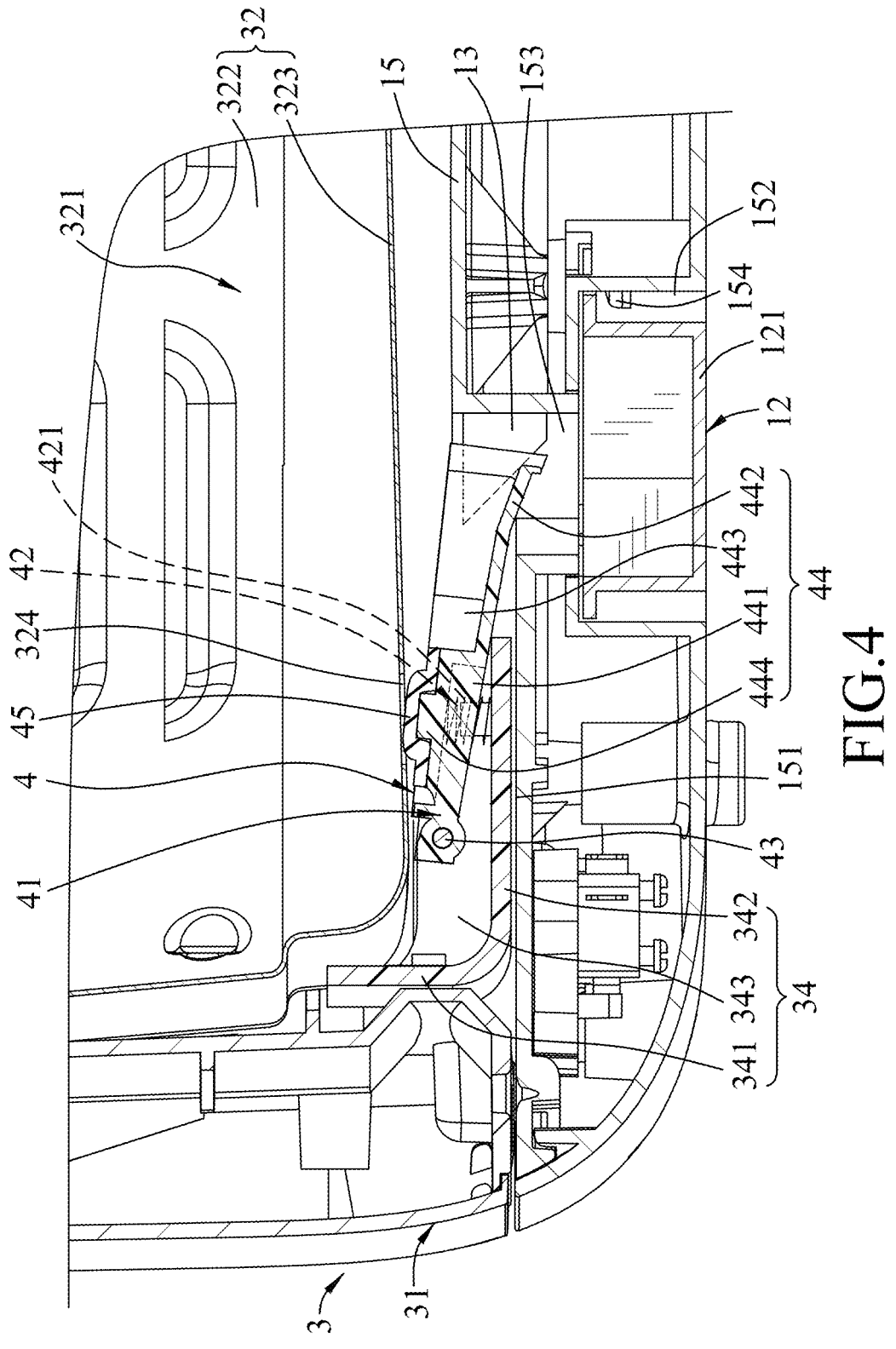
FIG. 4 is a fragmentary sectional view illustrating the cooker body unit in the engaging state and a valve unit of the embodiment in an open state.
Figure 5:
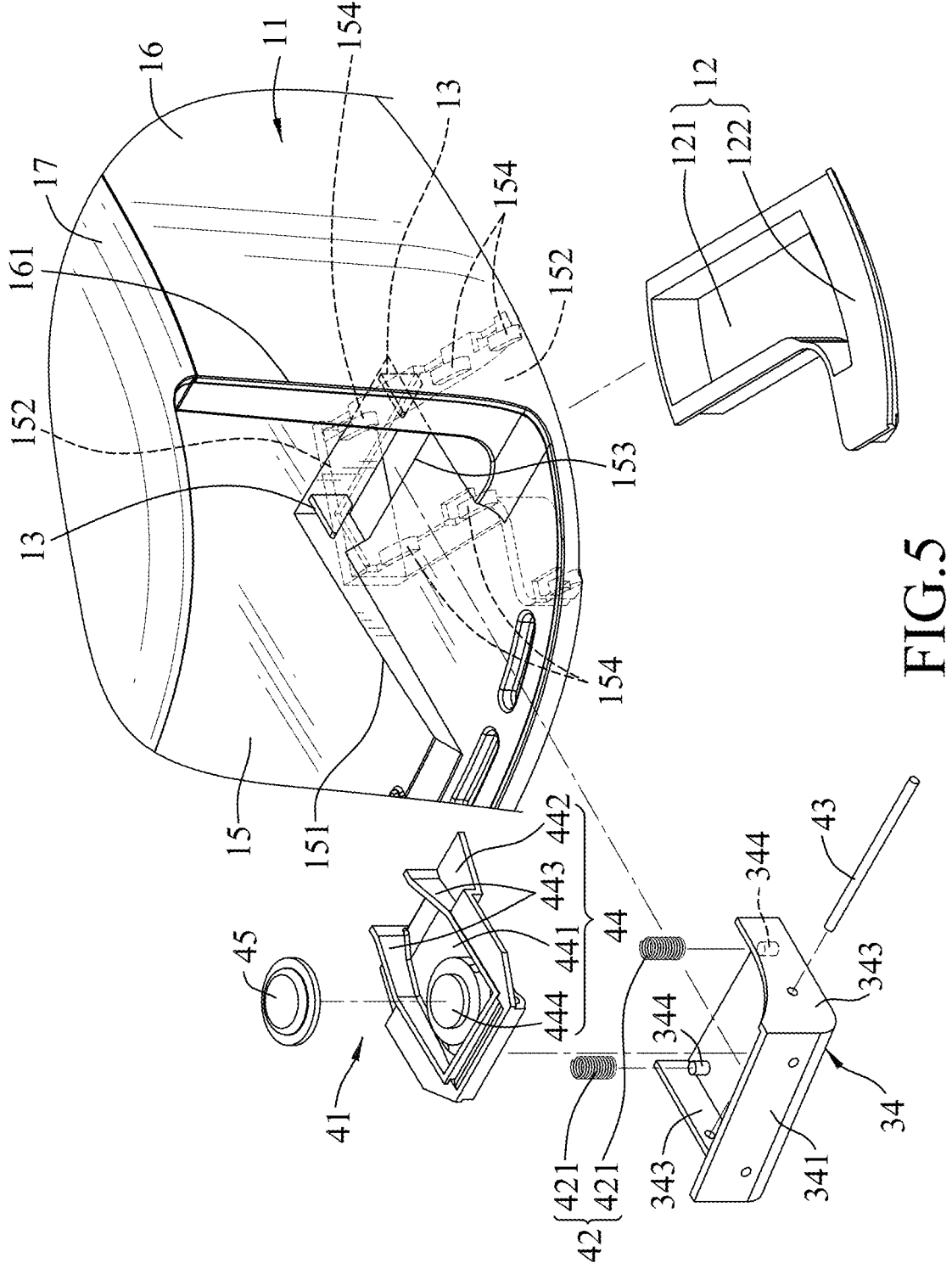
FIG. 5 is a fragmentary, exploded perspective view of part of the embodiment.

Referring further to FIGS. 4 and 5, the housing unit 1 includes a casing body 11 that has an opening which opens in the front direction, a container 12 that removably engages a bottom portion of the casing body 11, and two push blocks 13. Each of the push blocks 13 protrudes forwardly from the casing body 11 (see FIG. 5).

The casing body 11 includes a casing top wall 14 and a casing bottom portion 15 that are spaced apart from each other in an up-down direction, a casing side wall 16 that extends upwardly from the casing bottom portion 15 and that defines an engaging surface 161 located at a front thereof, and a casing surrounding wall 17 that is annular, that is located between the casing top wall 14 and the casing side wall 16 in the up-down direction, and that integrally interconnects the casing top wall 14 and the casing side wall 16.

An upper part of the casing bottom portion 15 is formed with a casing groove 151 (see FIG. 5) that opens forwardly. A lower part of the casing bottom portion 15 is formed with a rail groove 152 and a passage 153. The rail groove 152 is elongated and opens in a first rail direction that forms an acute angle with the front direction, and receives the container 12 (see FIG. 3). The passage 153 is located between the casing groove 151 and the rail groove 152 in the up-down direction, and spatially communicates with the casing groove 151 and the rail groove 152.

When the cooker unit 3 is pushed toward the housing unit 1, the valve unit 4 enters the casing groove 151 in the rear direction and is then accommodated in the casing groove 151. When the cooker unit 3 is pulled out of the housing unit 1, the valve unit 4 moves forwardly relative to the casing groove 151 and is then separated from the casing groove 151.

The casing bottom portion 15 further includes a plurality of guiding blocks 154 that are located in the rail groove 152. The guiding blocks 154 are arranged in a plurality of pairs that are spaced apart from each other in the first rail direction in which the rail groove 152 is elongated. The two guiding blocks 154 in each pair are located at two opposite sides of the rail groove 152 in a second rail direction that is orthogonal to the first rail direction. The guiding blocks 154 cooperatively serve as rails that support and guide the container 12 so that the container 12 may engage or be separated from the casing body 11 smoothly.

The container 12 includes a liquid storing portion 121 that is elongated in the first rail direction, and a handle portion 122 that extends along outer contours of the casing bottom portion 15. The liquid storing portion 121 is adapted for storing liquid. The handle portion 122 is adapted to be operated by a user so that the container 12 may be pulled out of or engages the casing body 11. When the container 12 engages the casing body 11, the handle portion 122 cooperates with the casing bottom portion 15 to define a complete bottom portion of the casing body 11.

The push blocks 13 are located at a rear end of the casing groove 151, and are spaced apart from each other in a left-right direction orthogonal to the front direction and the up-down direction. Each of the push blocks 13 has a top end, a bottom end that is under the top end, and a front end that extends forwardly when extending from the bottom end to the top end. Specifically, in this embodiment, each of the push blocks 13 has a cross section on an imaginary plane normal to the left-right direction, and the cross section is a right trapezoid that has an acute angle on a top side thereof.

Referring to FIG. 2 again, the cooker unit 3 includes a cooker body 32 that defines an accommodating space 321 adapted for accommodating ingredients (not shown) and located above the container 12. The heating unit 2 is surrounded by the casing surrounding wall 17 of the casing body 11, and includes elements such as a fan and a heating coil (not shown) so that the heating unit 2 is capable of providing hot air flow to heat the cooker unit 3, thereby heating the ingredients accommodated in the accommodating space 321 of the cooker unit 3. Since the structure of the heating unit 2 is widely-understood by those skilled in the art, a detailed description and illustration thereof are omitted for the sake of brevity.

Referring to FIGS. 3 to 5 again, the cooker unit 3 further includes a wall body 31 that removably engages the engaging surface 161 of the casing body 11 (i.e., the cooker unit 3 is located at the front of the side wall 16 when engaging the casing body 11) and that is mounted to a front end of the cooker body 32, an cooker handle 33, and a supporting seat 34. The cooker handle 33 is mounted to a front end of the wall body 31, and is configured to be an inverted L shape. The supporting seat 34 is located under the cooker body 32.

When the wall body 31 engages the engaging surface 161, the wall body 31 covers the engaging surface 161 and cooperates with the casing body 11 to define a complete body of the cooker machine.

The cooker body 32 includes a cooker surrounding wall 322 and a cooker bottom wall 323 that cooperatively define the accommodating space 321 (see FIG. 4). The cooker bottom wall 323 is located above the push blocks 13 of the housing unit 1 and defines an outlet 324 on one of a front-right side and a front-left side thereof. The accommodating space 321 is located above the outlet 324 and communicates with the container 12 through the outlet 324. The cooker bottom wall 323 is inclined to an imaginary horizontal plane. Specifically, the cooker bottom wall 323 extends downwardly from an outer periphery thereof to the outlet 324 so that liquid generated by the ingredients in the accommodating space 321 during cooking may flow toward the outlet 324. The outlet 324 is adjacent to the valve body unit 4, is located above the push blocks 13, and is adapted for the liquid to flow from a bottom of the accommodating space 321 therethrough.

The supporting seat 34 includes a first wall 341, a second wall 342, two side walls 343 and two positioning rods 344. The first wall 341 extends downwardly from one side of the wall body 31 adjacent to the cooker body 32. The second wall 342 extends rearwardly from the first wall 341 to a bottom side of the valve body assembly 41. The side walls 343 respectively extend upwardly from two opposite sides of the second wall 342 in the left-right direction. The positioning rods 344 are spaced apart from each other in the left-right direction, and extend upwardly from a rear side of the second wall 342.

The valve body assembly 41 is located between the cooker body 32 and the supporting seat 34 in the up-down direction, and is pivotally connected to the supporting seat 34 in the left-right direction. The resilient assembly 42 is located between the valve body assembly 41 and the supporting seat 34. Specifically, the valve body assembly 41 is pivotably connected to and located between the side walls 343, and the resilient assembly 42 is located between valve body assembly 41 and the second wall 342.

The valve body assembly 41 includes a valve rod 43 that extends through the side walls 343 of the supporting seat 34 in the left-right direction, a valve member 44 that is sleeved on the valve rod 43 so that the valve member 44 is pivotable relative to the supporting seat 34 in the up-down direction, and a plug member 45 that is mounted to the valve member 44, that is configured to be made of a flexible material, and that is hat-shaped.

The valve member 44 includes a main valve wall 441 that extends rearwardly from the valve rod 43 toward the push blocks 13 and that is mounted to the plug member 45, an abutting valve wall 442 that extends rearwardly and downwardly from one end of the main valve wall 441 opposite to the valve rod 43, and two side valve walls 443 that extend upwardly from the main valve wall 441 and the abutting valve wall 442, that are spaced apart from each other in the left-right direction, and that are located at two opposite sides of the plug member 45 in the left-right direction.

The main valve wall 441 includes a wall protrusion 444 that extends upwardly. The plug member 45 is mounted to the wall protrusion 444. A rear left end and a rear right end of the abutting valve wall 442 respectively abut against lower portions of the push blocks 13 of the housing unit 1 when the cooker unit 3 engages the casing body 11 (only the configurations of one of the rear left and rear right ends of the abutting valve wall 442 and the respective one of the push blocks 13 are visible due to orientation of the cross section in FIG. 4). The side valve walls 443, the main valve wall 441 and the abutting valve wall 442 are adapted for cooperatively guiding the liquid that flows out of the outlet 324 to the container 12. When the cooker unit 3 engages the casing body 11, the plug member 45 only occupies part of the outlet 324 of the cooker body 32 such that the outlet 324 is not closed (see FIG. 4).

The resilient assembly 42 includes two spring members 421 that are respectively sleeved on the positioning rods 344 of the supporting seat 34. Each of the spring members 421 is located between the main valve wall 441 of the valve member 44 and the second wall 342 of the supporting seat 34 in the up-down direction and resiliently biases the main valve wall 441 and the second wall 342 away from each other.

Figure 6:
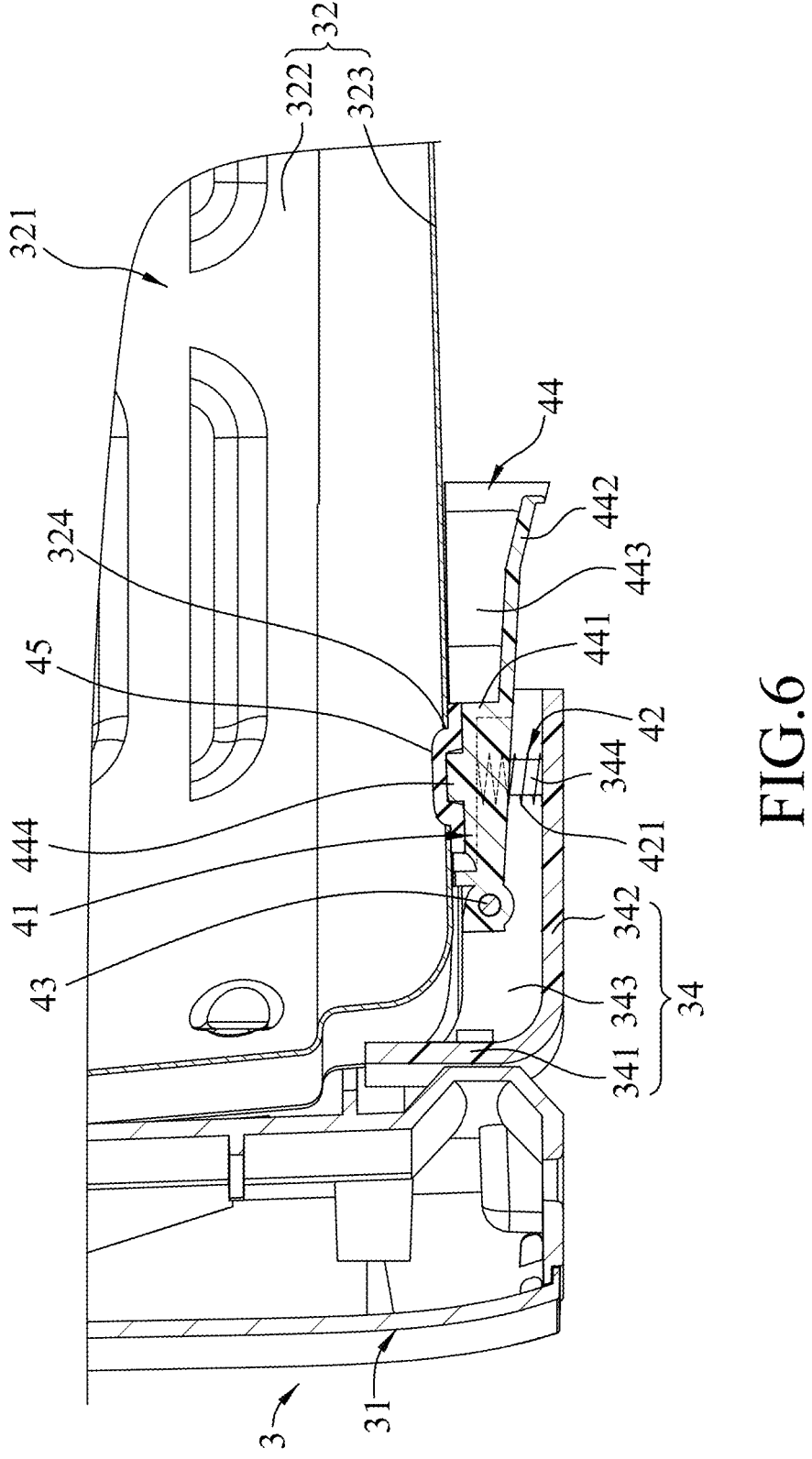
FIG. 6 is a fragmentary sectional view, illustrating the cooker body unit in the engaging state and the valve unit in a closed state.

The cooker unit 3 is operable to convert between an engaging state (see FIGS. 1, 2 and 4), in which the cooker unit 3 engages the casing body 11, and a separated state (see FIGS. 3 and 6), in which the cooker unit 3 is separated from the casing body 11. The valve unit 4 is convertible between an open state (see FIG. 4) and a closed state (see FIG. 6). Specifically, when the cooker unit 3 is in the engaging state, the cooker unit 3 is operable to be pulled forwardly out of the casing body 11 to thereby convert into the separated state. When the cooker unit 3 is in the separated state, the cooker unit 3 is operable to be pushed rearwardly toward the casing body 11 to thereby convert into the engaging state.

Referring to FIGS. 1 and 4 again, when the cooker unit 3 is in the engaging state, the valve unit 4 is in the open state, and allows the accommodating space to communicate with the container 12 through the outlet 324 such that the liquid generated by the ingredients during cooking is allowed to flow from the accommodating space 321 through the outlet 324 into the container 12. At this time, the wall body 31 of the cooker unit 3 engages to the engaging surface 161 of the casing side wall 16 to thereby close the engaging surface 161.

When the cooker unit 3 is converted from the separated state into the engaging state, the valve body assembly 41 is then urged to pivot downwardly by the push blocks 13 such that the resilient assembly 42 is compressed between the valve body assembly 41 and the cooker unit 3, and that the valve unit 4 is converted from the closed state into the open state.

When the cooker unit 3 is converted from the engaging state into the separated state, the valve body assembly 41 is then separated from the push blocks 13 and urged to pivot upwardly by the resilient assembly 42 such that the valve unit 4 is converted from the open state into the closed state.

By virtue of the front end of each of the push blocks 13 extending forwardly from the bottom end to the top end of the push block 13, when the cooker unit 3 is pushed rearwardly toward the casing body 11 (i.e., the conversion of the cooker unit 3 from the separated state into the engaging state), the rear left and rear right ends of the abutting valve wall 442 of the valve member 44 are respectively pushed downwardly by the front ends of the push blocks 13. At this time, the valve body assembly 41 pivots downwardly such that the main valve wall 441 presses the spring members 421 of the resilient assembly 42 downwardly. When the cooker unit 3 is converted into the engaging state, the abutting valve wall 442 then abuts against the lower portions of the push blocks 13 such that the valve body assembly 41 is refrained from pivoting upwardly and closing the outlet 324, and that the resilient assembly 42 is compressed downwardly by the valve body assembly 41. At this time, the valve unit 4 is in the open state, and the plug member 45 only occupies a small part of the outlet 324 and is refrained from plugging the outlet 324. The liquid that is generated by the ingredients during cooking is thus allowed to flow from the accommodating space 321 downwardly through the outlet 324, then along the main valve wall 441, the abutting valve wall 442 and the passage 153 formed by the casing bottom portion 15, and finally into the liquid-storing portion 121 of the container 12.

When the liquid flows along the main valve wall 441 and the abutting valve wall 442, the side valve walls 443 then prevent the liquid from flowing over the valve member 44 in the left-right direction so that the liquid may be ensured to flow into the container 12 precisely.

Referring to FIGS. 3 and 6 again, during the conversion of the cooker unit 3 from the engaging state into the separated state, the wall body 31 of the cooker unit 3 is disengaged from the engaging surface 161 of the casing side wall 16 of the casing body 11 such that the engaging surface 161 is exposed.

When the cooker unit 3 is converted into the separated state, the valve unit 4 is then in the closed state. At this time, the main valve wall 441 of the valve body assembly 41 is resiliently and upwardly biased by the spring members 421 of the resilient assembly 42 such that the valve body assembly 41 closes the outlet 324. Specifically, the plug member 45 plugs the outlet 324 to fully close the outlet 324. Therefore, the liquid is prevented from flowing through the outlet 324.

Because the valve unit 4 that is in the open state may instantly be converted into the closed state when the cooker unit 3 is pulled out of the housing unit 1, even when the user pulls out the cooker unit 3 before all the liquid flows out of the accommodating space 321, the liquid may still be blocked by the plug member 45 and may not flow out via the outlet 324. Therefore, in this embodiment, water and oil will not drip from the cooker unit 3 when the user pulls out the cooker unit 3.

In summary, by virtue of the container 12 of the cooking machine of this embodiment removably engaging the casing body 11 like a drawer, it is convenient for the user to remove the container 12 for emptying or cleaning the container 12, and to put the container 12 back afterwards. Thus, it is easier to maintain the cooking machine for good hygiene. In addition, by virtue of the valve unit 4 instantly converting between the closed state and the open state according to the state conversion of the cooker unit 3, when the cooker unit 3 engages the casing body 11, the liquid that is left in the accommodating space 321 may be discharged immediately, and when the cooker unit 3 is pulled out of the casing body 11, no liquid will drip from the cooker unit 3.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A cooking machine comprising:
a housing unit;
a heater disposed in the housing unit; and
a cooker unit located below the heater, the housing unit including a casing body, and a container that removably engages the casing body, the cooker unit removably engaging the casing body, and defining an accommodating space that is located above the container, and an outlet through which the accommodating space communicates with the container, the heater being capable of providing hot air flow to heat the cooker unit;
wherein the cooker unit is operable to convert between an engaging state, in which the cooker unit engages the casing body, and a separated state, in which the cooker unit is separated from the casing body;
wherein, when the cooker unit is in the engaging state, the cooker unit is operable to be pulled out of the casing body to thereby convert into the separated state;
wherein, when the cooker unit is in the separated state, the cooker unit is operable to be pushed toward the casing body to thereby convert into the engaging state;
wherein the cooking machine further comprises a valve unit that is adjacent to the outlet, and that is convertible between an open state and a closed state;
wherein, when the cooker unit is in the engaging state, the valve unit is in the open state, and allows the accommodating space to communicate with the container through the outlet;
wherein, when the cooker unit is in the separated state, the valve unit is in the closed state and closes the outlet;
wherein the valve unit includes a valve body assembly that is pivotably connected to the cooker unit, and a resilient assembly that is located between the valve body assembly and the cooker unit;
wherein the cooker unit further includes a cooker body that defines the accommodating space and the outlet, and a supporting seat that is located under the cooker body;
wherein the valve body assembly is located between the cooker body and the supporting seat in an up-down direction, and is pivotably connected to the supporting seat in a left-right direction orthogonal to the up-down direction, the resilient assembly being located between the valve body assembly and the supporting seat.

2. The cooking machine as claimed in claim 1, wherein the cooker body includes a cooker bottom wall that is inclined to an imaginary horizontal plane and that defines the outlet.

3. The cooking machine as claimed in claim 1, wherein:
the housing unit further includes at least one push block that protrudes from the casing body, the at least one push block being and that is located below the outlet when the cooker unit is in the engaging state;
when the cooker unit is converted from the separated state into the engaging state, the valve body assembly is urged to pivot downwardly by the at least one push block such that the resilient assembly is compressed between the valve body assembly and the cooker unit, and that the valve unit is converted from the closed state into the open state; and
when the cooker unit is converted from the engaging state into the separated state, the valve body assembly is separated from the at least one push block and urged to pivot upwardly by the resilient assembly such that the valve unit is converted from the open state into the closed state.

4. The cooking machine as claimed in claim 3, wherein:
when the cooker unit is in the engaging state, the valve body assembly abuts against the at least one push block such that the valve body assembly is refrained from pivoting upwardly and closing the outlet, and that the resilient assembly is compressed downwardly by the valve body assembly; and
when the cooker unit is in the separated state, the valve body assembly is resiliently and upwardly biased by the resilient assembly such that the valve body assembly closes the outlet.

5. The cooking machine as claimed in claim 4, wherein:
the cooker unit further includes a wall body that is mounted to the cooker body;
the supporting seat includes a first wall that extends downwardly from one side of the wall body adjacent to the cooker body, a second wall that extends from the first wall to a bottom side of the valve body assembly, and two side walls that respectively extend upwardly from two opposite sides of the second wall in the left-right direction; and
the valve body assembly is pivotably connected to and located between the side walls, and the resilient assembly is located between the valve body assembly and the second wall.

6. The cooking machine as claimed in claim 4, wherein:
the valve body assembly includes a valve rod that extends through the supporting seat in the left-right direction, a valve member that is sleeved on the valve rod so that the valve member is pivotable relative to the supporting seat in the up-down direction, and a plug member that is mounted to the valve member and that is configured to be made of a flexible material, the plug member plugging the outlet to close the outlet when the valve unit is in the closed state, the plug member being refrained from plugging the outlet when the valve unit is in the open state.

7. The cooking machine as claimed in claim 6, wherein:
the valve member includes a main valve wall that extends from the valve rod toward the at least one push block and that is mounted to the plug member, an abutting valve wall that extends downwardly from one end of the main valve wall opposite to the valve rod, and that abuts against a lower portion of the at least one push block of the housing unit when the cooker unit is in the engaging state, and two side valve walls that extend upwardly from the main valve wall and the abutting valve wall, that are spaced apart from each other in the left-right direction, and that are located at two opposite sides of the plug member in the left-right direction.

* * * * *